United States Patent [19]

Lippacher et al.

[11] 4,113,404
[45] Sep. 12, 1978

[54] DEPTH STOP FOR A DRILLING MACHINE

[75] Inventors: Wolfgang Lippacher, Breitbrunn; Gerhard Teger, Munich, both of Germany

[73] Assignee: Hilti Aktiengesellschaft, Schaan, Liechtenstein

[21] Appl. No.: 791,950

[22] Filed: Apr. 28, 1977

[30] Foreign Application Priority Data

May 3, 1976 [DE] Fed. Rep. of Germany ... 7613952[U]

[51] Int. Cl.² .................... B23B 49/00; B23B 45/14
[52] U.S. Cl. ................. 408/241 S; 408/113; 408/202; 83/468; 82/34 A
[58] Field of Search ............ 408/72 R, 202, 203, 408/112, 113–116, 241 R, 241 S, 236, 237, 712, 4, 14; 83/467 R, 468; 82/34 A

[56] References Cited

U.S. PATENT DOCUMENTS

| 814,193 | 3/1906 | Durell | 83/468 |
|---|---|---|---|
| 2,094,936 | 10/1937 | Woodnal | 408/712 X |
| 3,031,699 | 5/1962 | Fleury | 408/203 |
| 3,779,663 | 12/1973 | Ruggles | 408/113 |
| 3,796,506 | 3/1974 | Buck | 408/236 X |

Primary Examiner—Leonidas Vlachos
Attorney, Agent, or Firm—Toren, McGeady and Stanger

[57] ABSTRACT

A depth stop is mounted on the casing of a drilling machine and includes a clamping lever with a bore through which an elongated rod extends. The rod acts as the stop. Lugs attached to the casing pivotally support the clamping lever. The lever has a clamping surface which engages the surface of the casing in the clamped position. The clamping surface extends circumferentially of the axis of the bore in the lever and is arranged eccentrically relative to the axis.

7 Claims, 3 Drawing Figures

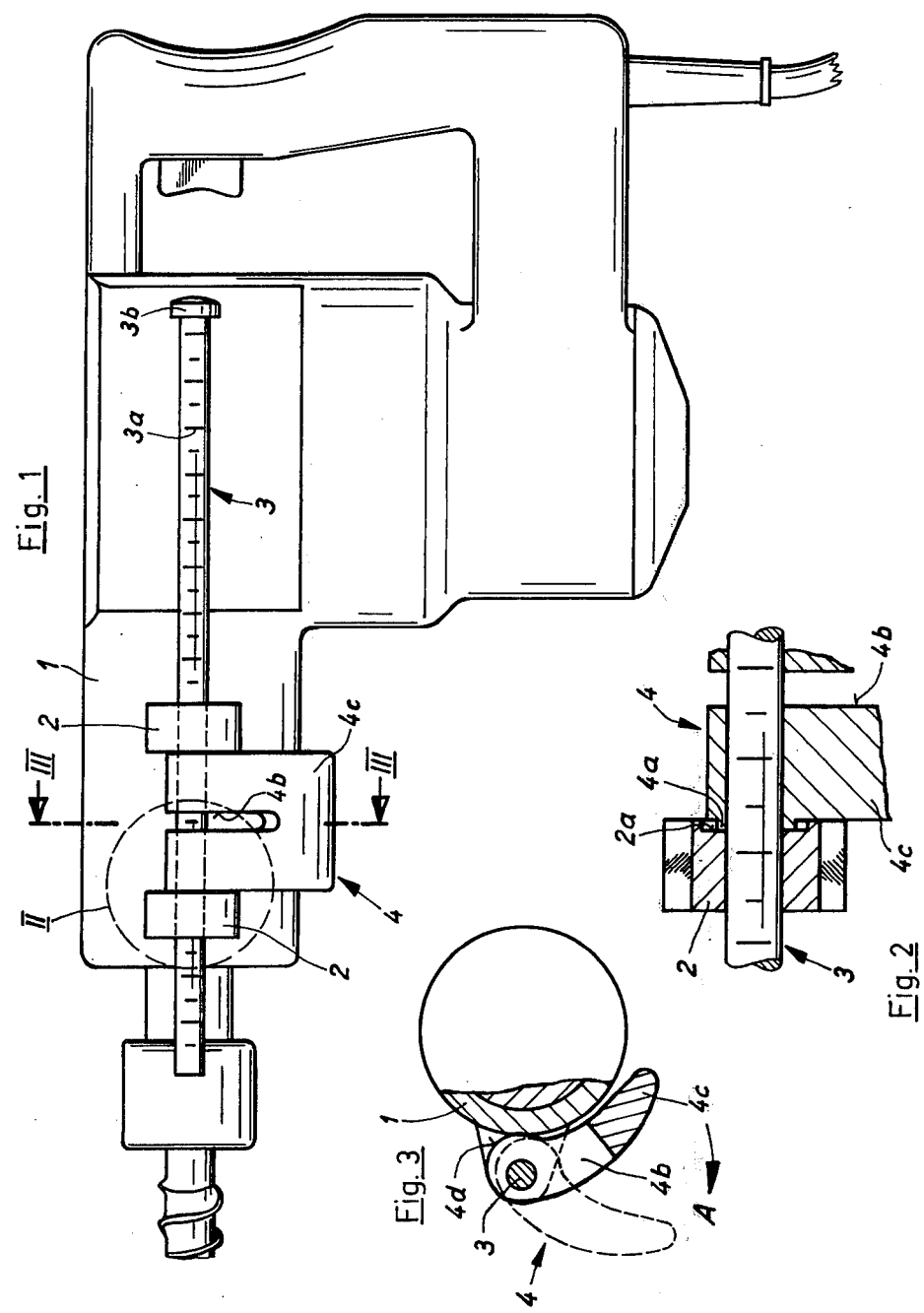

DEPTH STOP FOR A DRILLING MACHINE

SUMMARY OF THE INVENTION

The present invention is directed to a rod-shaped depth stop for a drilling machine and, more specifically, to a clamping lever for displaceably mounting the stop on the machine casing.

In known drilling machines, the depth stop is displaceably and lockably mounted in a bearing positioned laterally on the machine casing. The locking action is effected by a locking lever screwed radially into a lug of the bearing and it is tensioned under point contact against the rod-shaped depth stop.

One of the disadvantages of this arrangement is the requirement of a threaded connection between the locking lever and the bearing lug. There is the risk that the locking lever will become disengaged from the bearing lug in the unclamped state and fall off. Another disadvantage of this arrangement is that the clamping position of the locking lever changes gradually due to wear and, as a result, the locking lever handle which projects outwardly away from the machine casing, is located in a position which is very unfavorable for handling the drilling machine. Often it is difficult to drill with such a machine when it is close to a wall. Another disadvantage in the guidance and clamping afforded by such a depth stop is that the stop is guided over a very short length and soon becomes bent and jams when the drilling machine is used in operations on heavy construction sites. Furthermore, the depth stop is bent by the locking operation which is practical only at certain points.

The primary object of the present invention is to provide a depth stop for a drilling machine which is simple to handle and is not subject to operating problems.

In accordance with the present invention, the problems experienced in the past are overcome by using an eccentric lever for clamping the depth stop. The lever has a clamping surface which bears on the drilling machine casing and extends eccentrically of the longitudinal axis of the rod-shaped depth stop.

In the present invention the eccentric lever for the depth stop is held by the stop itself so that screws or similar retaining means are not required. With this arrangement it is not possible for the eccentric lever to fall off. Additionally, the eccentric lever is, for practical purposes, not subject to wear, because of the large-surface contact with the depth stop and the machine casing. Accordingly, its operating clamping position is retained in a self-locking manner, that is, in surface contact with the machine casing. In the clamping position, the eccentric lever has its handle in bearing contact with the machine casing, so that during operation the lever does not project to a position where it impairs the handling of the drilling machine. Moreover, because of the large area or surface of contact between the eccentric lever and the depth stop, the stop does not bend in the clamped position.

Another feature of the invention is the arrangement of the eccentric lever between two bearing lugs on the machine casing which also serve as guides for the stop. With this arrangement an extended axial guide is provided for the depth stop with the result that bending or jamming of the stop is, to a great extent, avoided.

It is preferable if the eccentric lever is supported between bearing lugs by means of extensions on one and recesses in the other. Further, the depth stop extends through both the eccentric lever and the bearing lugs. With such a construction, the eccentric lever is retained on the drilling machine, even when the depth stop is removed. Moreover, this arrangement affords radial play between the extensions and the recesses to afford effective clamping of the depth stop.

On one hand, to facilitate the assembly of the eccentric lever, and, on the other hand, to achieve self-locking of the eccentric lever in any desired position, the lever is preferably partially traversed by an elongated slot extending transversely of the axial direction of the depth stop. Accordingly, the eccentric lever can be shortened by compression in the space between the bearings and introduced into the lugs. At the same time, the self-locking action between the lever and the lugs is provided by an initial stress.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 1 is a side view of the drilling machine with a depth stop in the clamped position;

FIG. 2 is an enlarged view of the encircled portion II of FIG. 1; and

FIG. 3 is a transverse view partially in section taken along the line III—III in FIG. 1.

DETAILED DESCRIPTION OF THE INVENTION

In FIG. 1, a drilling machine is illustrated having a casing 1 with two bearing lugs 2 spaced apart in the axial direction of the drilling machine and forming lateral projections therefrom. A rod-shaped depth stop 3 extends axially through the lugs 2. The stop is axially displaceable through the bearing lugs. As can be seen in FIGS. 1 and 2, the stop has a scale 3a, and a head 3b at its rear end for preventing the stop from being displaced through the lugs in the drilling direction of the machine.

Secured between the bearing lugs 2 is an eccentric lever 4 through which the depth stop extends. In other words, the stop extends first through a bore in one of the lugs, through a bore in the eccentric lever and then through a bore in the other lug.

To assure that the eccentric lever 4 is retained between the bearing lugs when the depth stop 3 is removed, extensions 4a are provided on the opposite sides or surfaces of the lever which face in the axial direction of the stop, note FIG. 2. Corresponding recesses 2a are formed in the surfaces of the bearing lugs which face inwardly toward the lever 4. The recesses 2a have a larger cross sectional area than the extensions 4a. In addition, an elongated slot 4b is formed in the eccentric lever 4 which facilitates the assembly of the lever into the lugs and effects an initial stress when the lever is placed between the lugs so that it is self-locking in any desired position.

As illustrated in FIG. 3, the eccentric lever 4 has a handle 4c which bears against the machine casing 1 in the clamping position and thus does not interfere with the handling of the drilling machine. The clamping of the depth stop is effected by a clamping surface 4d of the eccentric lever and the clamping surface is arranged eccentrically with respect to the bore through the lever in which the rod-shaped depth stop bears. In the clamping position, the clamping surface 4d is tensioned against the surface of the machine casing for effecting the locking of the depth stop. As shown in FIG. 3, by pivoting the eccentric lever 4 in the direction A about the axis of the bore through the lever, into the position shown in dashed lines, the clamping surface 4d is displaced from contact with the surface of the maching casing. As a result, the depth stop is freely displaced through the bores in the lever and the lugs.

While specific embodiments of the invention have been shown and described in detail to illustrate the application of the inventive principles, it will be understood that the invention may be embodied otherwise without departing from such principles.

What is claimed is:

1. On a drilling machine including a casing, a depth stop mounted on said casing, said depth stop comprising an axially displaceable rod, wherein the improvement comprises a clamping lever having a bore therethrough with said rod extending through the bore, said lever being elongated and extending transversely of the axial direction of the bore therethrough, said lever having a clamping surface thereon and being pivotally displaceable about the axis of the bore therethrough for movement of the clamping surface into and out of contact with the casing so that with the clamping surface bearing on said casing, said rod is held against axial displacement, said clamping surface extending circumferentially of the axis of the bore and being arranged eccentrically of the axis, and a pair of bearing lugs secured to said casing and spaced apart in the axial direction of said rod, said lever being pivotally supported on said lugs.

2. On a drilling machine, as set forth in claim 1, wherein one of said lever and said lugs having protuberances thereon and the other having recesses therein with said protuberances engaging within said recesses.

3. On a drilling machine, as set forth in claim 2, wherein each said lug having a bore therethrough with said rod extending through the bores in said lugs, each said lug having a surface facing toward a surface on the other said lug, each said surface having one said recess formed therein, said lever being positioned between said lugs and having a pair of oppositely projecting said protuberances thereon each extending into one of said recesses in the adjacent said lug for supporting said lever in said lugs.

4. On a drilling machine, as set forth in claim 3, wherein said lever having an elongated slot therein extending transversely of the axial direction of the bore therethrough.

5. On a drilling machine, as set forth in claim 4, wherein said lever having a first end and a second end with the bore therethrough being located between said first and second ends and said clamping surface located at said first end, said slot extending from said first end on said lever across the bore therethrough and from the bore toward and terminating short of said second end.

6. On a drilling machine, as set forth in claim 3, wherein said recesses in said lugs having a larger cross sectional area than the cross sectional area of said protuberances so that radial play is provided between said protuberances and said recesses.

7. On a drilling machine, as set forth in claim 1, wherein at least one end of said rod having a laterally outwardly extending shoulder for preventing displacement of said rod through the bores in said lugs and said lever.

* * * * *